(12) United States Patent
Furuya

(10) Patent No.: US 6,891,409 B2
(45) Date of Patent: May 10, 2005

(54) SEMICONDUCTOR DEVICE

(75) Inventor: Kenji Furuya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/610,761

(22) Filed: Jul. 2, 2003

(65) Prior Publication Data

US 2004/0019818 A1 Jan. 29, 2004

(30) Foreign Application Priority Data

Jul. 16, 2002 (JP) .................................... 2002-206433

(51) Int. Cl.[7] .............................................. H03L 7/00
(52) U.S. Cl. ......................... 327/141; 327/142; 327/99
(58) Field of Search .......................... 327/99, 141, 142, 327/144, 145, 162

(56) References Cited

U.S. PATENT DOCUMENTS 6,473,852 B1 * 10/2002 Hanjani .......................... 713/1

* cited by examiner

Primary Examiner—Timothy P. Callahan
Assistant Examiner—Cassandra Cox
(74) Attorney, Agent, or Firm—Arent Fox PLLC

(57) ABSTRACT

For suppressing increase of terminals in number, a semiconductor device is proposed which includes an input terminal to which an external clock is to be inputted. The semiconductor device further includes a crystal oscillating circuit, a storing circuit, and a selecting circuit. The crystal oscillating circuit generates an internal clock on the basis of the vibrating frequency of a crystal oscillator. The input terminal is inputted with a using information signal for indicating using information of the external clock and an input signal composed of the external clock. The storing circuit holds the using information signal being inputted into the input terminal when a reset signal is being inputted into a reset terminal and then outputs the signal. The selecting circuit is inputted with the internal clock and the external clock inputted at the input terminal and then outputs one of the clocks in response to the using information signal outputted from the storing circuit. This operation allows the input terminal to be used as the terminal to which the external clock and the using information signal are to be inputted, thereby being able to suppress the increase of the terminals in number.

6 Claims, 11 Drawing Sheets

SEMICONDUCTOR DEVICE

CROSS-REFERENCE TO RELATED APPLICATIONS

This application is based upon and claims the benefits of priority from the prior Japanese Patent Application No.2002-206433, filed on Jul. 16, 2002, the entire contents of which are incorporated herein by reference.

BACKGROUND OF THE INVENTION (1) Field of the Invention

The present invention relates to a semiconductor device, and more particularly to the semiconductor device which is operated in synchronism with an internal clock or an external one.

(2) Description of the Related Art

One typical example of a semiconductor device that is operated in synchronism with a clock is a microcomputer. Such semiconductor device can connect a crystal oscillator with itself externally, by which the clock is generated inside the device.

FIG. 10 shows a crystal oscillating circuit included in the conventional semiconductor device. A semiconductor device 100 includes crystal oscillating terminals X0 and X1 to which a crystal oscillator is connected externally and a crystal oscillating circuit 101 for generating an internal clock. The connection of the crystal oscillator with the crystal oscillating terminals X0 and X1 causes the crystal oscillating circuit 101 to generate the internal clock. The crystal oscillating circuit 101 is designed to oscillate stably in the assumed frequency range of the crystal oscillator.

The crystal oscillating circuit 101 is composed of FET transistors Q3 and Q4, an inverter circuit Z7, a NAND circuit Z8, and a Schmitt trigger circuit Z9. The FET transistors Q3 and Q4 are n-channel and p-channel FET transistors, respectively. When an H-level (simply referred to as H) signal is inputted into a signal line S, the source of the FET transistor Q3 is connected with the drain of the FET transistor Q4. This connection causes the crystal oscillator connected with the crystal oscillating terminals X0 and X1 to have a feedback circuit composed of the FET transistors Q3 and Q4 in parallel.

The crystal oscillating circuit 101 is operated to generate a clock depending on the predetermined relation between an on resistance (feedback resistance) between the source of the FET transistor Q3 and the drain of the FET transistor Q4 and a vibrating frequency. Since the on resistance between the source of the FET transistor Q3 and the drain of the FET transistor Q4 is fixed, the crystal oscillator to be connected with the crystal oscillating terminals X0 and X1 is uniquely defined.

In the circuit shown in FIG. 10, it is assumed that the H signal is on the signal line S and an L-level (simply referred to as L) signal takes place in the crystal oscillating terminal X1. In this case, the NAND circuit Z8 supplies the H signal. The H signal is inputted again into the NAND circuit Z8 through the crystal oscillator connected with the crystal oscillating terminals X0 and X1. Then, the NAND circuit Z8 supplies the L signal. The series of operations are repeated so that the NAND circuit Z8 alternately supplies the H signal and the L signal. The Schmitt trigger circuit Z9 shapes this signal and then supplies the shaped signal as the internal clock.

In a case that the semiconductor device is operated or tested at a fast speed, the higher clock than the assumed frequency of the crystal oscillator is inputted into the crystal oscillating terminals X0 and X1. However, when the fast clock is inputted therein, the gate delay of the NAND circuit Z8 does not become negligible with respect to the frequency, so that the Schmitt trigger circuit Z4 can not supply the corresponding clock with the frequency of the inputted clock. Hence, an inverter circuit is connected with one of the crystal oscillating terminals so that the inverted fast clock may be inputted to the device. FIG. 11 is a block diagram showing the semiconductor device in which a crystal oscillator terminal is connected with an inverter circuit. A fast external clock 102 supplies faster clock than the internal clock of the semiconductor device 100. An inverter circuit Z10 is connected with the crystal oscillating terminal X1 of the semiconductor device 100 so that the fast clock can be inputted into the crystal oscillating terminal X0 and the inverted fast clock is inputted into the crystal oscillating terminal. These inputs allow the delay of the feedback gate to be cancelled.

However, disadvantageously, the inverter circuit to be connected for the purpose of inputting the fast clock into the crystal oscillating terminal increases the number of necessary components and the mounting area.

It is desired to develop a semiconductor device having a new input terminal apart from the crystal oscillating terminal for inputting the external clock and a using information signal indicating whether or not the external clock is to be used and in which the input terminal is used as a terminal for inputting the external clock and the using information signal. Thereby, the increase of the terminal in number will be suppressed.

SUMMARY OF THE INVENTION

The present invention was created in view of the above circumstances, and an object thereof is to provide a semiconductor device having a terminal to which an external clock is to be inputted from the outside in which device the increase of the terminals in number is suppressed.

To achieve the above object, a semiconductor device is provided to be operated in synchronism with the internal or external clock. The semiconductor device includes a crystal oscillating circuit for generating an internal clock based on the vibrating frequency of a crystal oscillator connected externally, an input terminal to which a using information signal indicating the using information of the external clock and the external clock is to be inputted, a storing circuit for holding the state of the using information signal appearing while a reset signal is asserted and then outputting it, and a selecting circuit for outputting one of the internal clock and the external clock in response to the state of the using information signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereafter, the embodiments of the present invention will be described with reference to the appended drawings.

Figure 1:
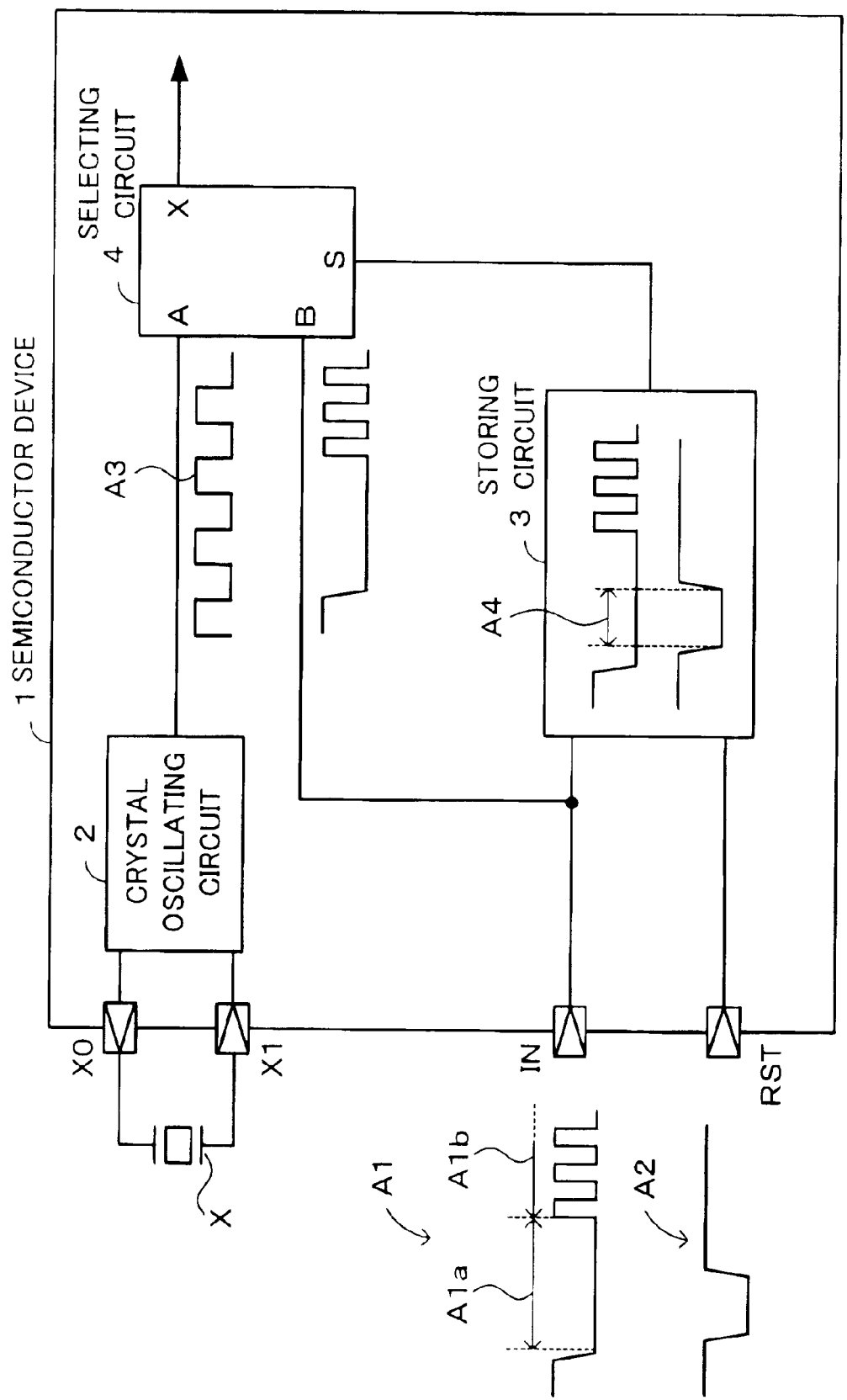
FIG. 1 is a diagram showing the principle of the present invention.

FIG. 1 is a diagram showing the principle of the present invention. As shown in FIG. 1, the semiconductor device 1 includes a crystal oscillating circuit 2, a storing circuit 3, a selecting circuit 4, crystal oscillating terminals X0 and X1, an input terminal IN, and a reset terminal RST. The semiconductor device 1 is operated in synchronous to the clock supplied from the selecting circuit 4.

The crystal oscillating terminals X0 and X1 includes a crystal oscillator connected externally. In FIG. 1, it is a crystal oscillator X.

The input terminal IN is inputted with a using information signal for indicating whether or not the external clock is to be used and the external clock.

An input signal A1 indicates the using information signal and the external clock to be inputted into the input terminal IN. The portion indicated by the area A1a corresponds to the using information signal. The portion indicated by the area A1b corresponds to the external clock.

The reset terminal RST is inputted with a reset signal for resetting the semiconductor device 1. The using information signal is required to be inputted into the input terminal when the reset signal is being inputted into the reset terminal RST.

A reset signal A2 is inputted into the reset terminal RST. If the reset signal A2 is in the L state, the reset is effective.

The crystal oscillating circuit 2 oscillates in response to the vibrating frequency of the crystal oscillator X connected with the crystal oscillating terminals X0 and X1 and output the clock. The outputted clock is supplied as the internal clock to the selecting circuit 4.

An internal clock A3 is outputted from the crystal oscillating circuit 2.

The storing circuit 3 is inputted with the input signal A1 from the input terminal IN at a time when the reset signal A2 is inputted from the reset terminal RST. The storing circuit 3 holds the state of the using information signal appearing while the reset signal is asserted and then outputs the using information signal.

The selecting circuit 4 is inputted with the internal clock outputted from the crystal oscillating circuit 2 at the terminal A and the external clock inputted from the input terminal IN at the terminal B. The selecting circuit 4 is inputted with the using information signal held in and outputted from the storing circuit 3 at the terminal S. The selecting circuit 4 outputs the internal clock inputted at the terminal A and the external clock inputted at the terminal B from the terminal X in response to the using information signal being inputted into the terminal S. Herein, the selecting circuit 4 is inputted with the using information signal in the L state and outputs the external clock.

Hereafter, the operation of the principle view will be described.

The crystal oscillating circuit 2 oscillates in response to the vibrating frequency of the crystal oscillator X connected with the crystal oscillating terminals X0 and X1 and then output the internal clock A3. The internal clock is inputted into the terminal A.

The storing circuit 3 holds the state of the using information signal of the input signal A1 appearing when the reset signal A2 is inputted onto the reset terminal RST and then outputs the signal. As shown in the area A4 of FIG. 1, when the reset signal A2 is in the L state, the using information signal is in the L state. Hence, the storing circuit 3 holds the using information signal in the L state and then outputs the signal.

In response to the using information signal in the L state outputted from the storing circuit 3, the selecting circuit 4 selects the external clock being inputted into the terminal B and then outputs the selected clock.

In a case that the using information signal in the H state is inputted into the input terminal IN, the storing circuit 3 holds the H signal and then outputs it. In this case, the selecting circuit 4 selects the internal clock being inputted into the terminal A and then outputs it.

As described above, the storing circuit holds the state of the using information signal appearing while the reset signal is being asserted and then outputs it to the selecting circuit. By this operation, after the using information signal is stored in the storing circuit, the external clock is inputted into the input terminal. It means that the input terminal may be used as the terminal to which the external clock and the using information signal are to be inputted. This leads to suppressing the increase of the terminals in number.

Hereafter, the embodiments of the present invention will be described in detail.

Figure 2:
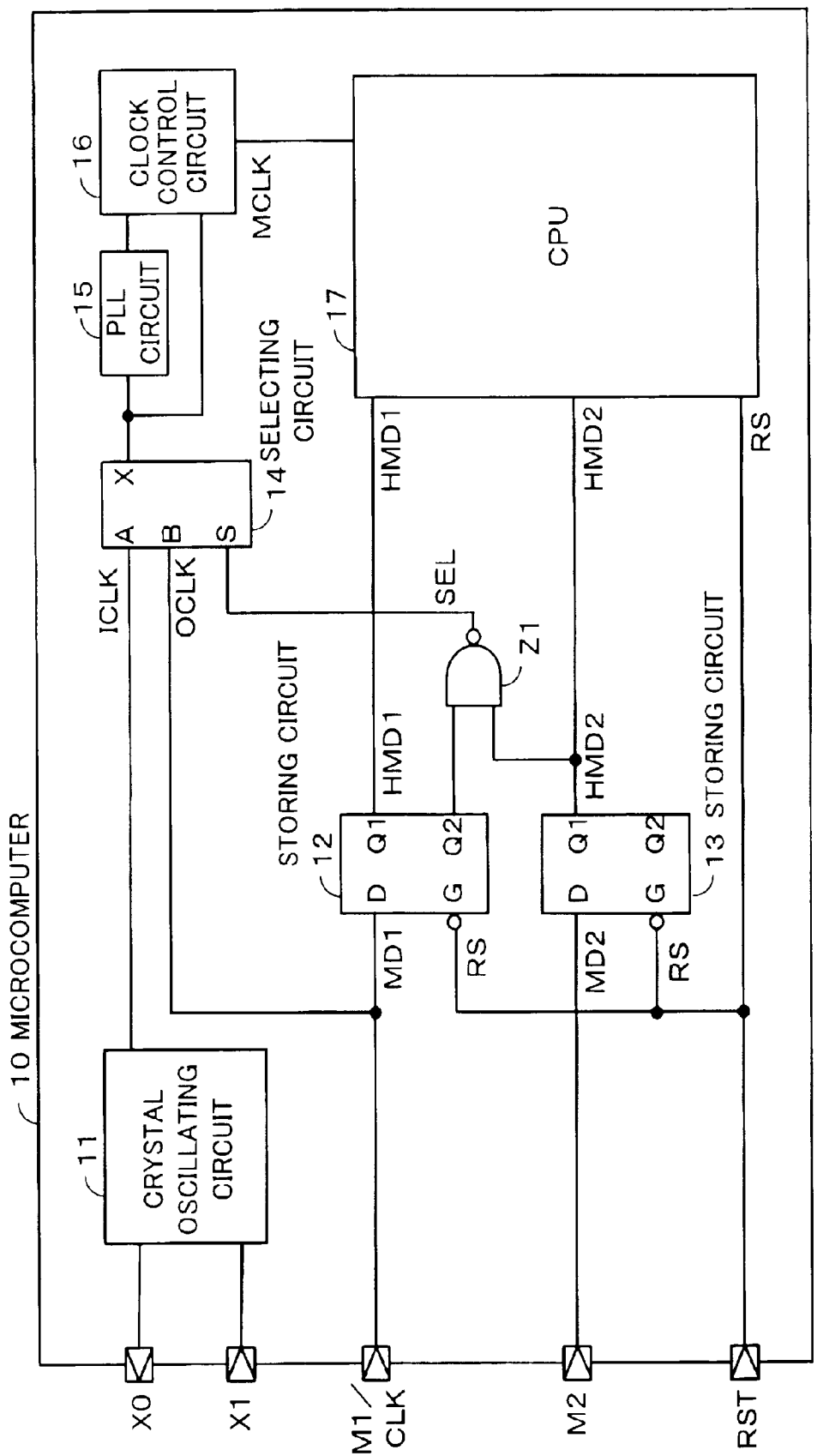
FIG. 2 is a circuit diagram showing a microcomputer according to a first embodiment of the present invention.

FIG. 2 is a circuit diagram showing a microcomputer according to a first embodiment of the present invention. The microcomputer 10 includes a crystal oscillating circuit 11, storing circuits 12 and 13, a NAND circuit Z1, a selecting circuit 14, a PLL (Phase Locked Loop) circuit 15, a clock control circuit 16, and a CPU 17. It further includes the crystal oscillating terminals X0 and X1, a mode/external clock terminal M1/CLK, a mode terminal M2, and the reset RST.

The crystal oscillating terminals X0 and X1 are to be connected with the crystal oscillator.

The mode/external clock terminal M1/CLK is a terminal to which are to be inputted a mode signal MD1 for indicating whether the external clock is to be used and the external clock OCLK on which the CPU 17 is operated by synchronous mode. The mode signal MD1 is also inputted into the CPU 17 for defining the operation mode of the CPU 17.

The reset terminal RST is a terminal into which the reset signal RS for resetting (initializing) the CPU 17 is to be inputted.

Though not shown in FIG. 2, the CPU 17 executes the program saved in a memory outside or inside the microcomputer 10 in synchronous to the operation clock MCLK outputted from the clock control circuit 16. Further, depending on the states of the mode signals MD1 and MD2 appearing while the reset signal RS is being asserted, the operation mode of the CPU 17 is determined. For example, while the reset signal RS is being asserted into the CPU 17, by inputting a given mode signal, the operation mode is determined. The CPU 17 includes as its operation mode a fast operation testing mode, a low power consumption mode, and so forth. In addition, the CPU 17 is reset when the reset signal RS enters into the L state.

The crystal oscillating circuit 11 oscillates based on the vibrating frequency of the crystal oscillator connected with the crystal oscillating terminals X0 and X1 and then output the internal clock ICLK. The internal clock ICLK is outputted into the selecting circuit 14.

The storing circuit 12 is inputted with the mode signal MD1 to be inputted into the mode/external clock terminal M1/CLK at the terminal D. The storing circuit 12 is inputted with the reset signal RS to be inputted into the reset terminal RST at the terminal G. The storing circuit 12 holds the state of the mode signal MD1 being inputted into the terminal D, appearing while the reset signal RS is being asserted in the terminal G, and outputs the holding signal HMD1 at the terminal Q1. The storing circuit 12 outputs at the terminal Q1 the inverted signal of the holding signal HMD1 outputted from the terminal Q1.

The storing circuit 13 is inputted with the mode signal MD2 at the terminal D, the mode signal MD2 being to be inputted into the mode terminal M2. The storing circuit 13 is inputted with the reset signal RS at the terminal G the reset signal RS being to be inputted into the reset terminal RST. The storing circuit 13 holds the state of the mode signal MD2 being inputted into the terminal D, the state appearing while the reset signal RS is being asserted in the terminal G, and outputs the holding signal HMD2 at the terminal Q1. The storing circuit 13 outputs the inverted signal of the holding signal HMD2 at the terminal Q1, the holding signal HMD2 being outputted from the terminal Q1. The terminal Q2 is not in use.

The NAND circuit Z1 is inputted with the inverted holding signal HMD1 to be outputted at the terminal Q1 of the storing circuit 12 and the holding signal HMD2 to be outputted at the terminal Q1 of the storing circuit 13. The NAND circuit Z1 performs a NAND operation with respect to the inputted signal and then outputs it as the selecting signal SEL to the selecting circuit 14. Concretely, the NAND circuit Z1 is inputted with the H signal supplied at the terminal Q1 of the storing circuit 12 and the H signal supplied at the terminal Q1 of the storing circuit 13 and then outputs the L selecting signal SEL.

The selecting circuit 14 is inputted with the internal clock ICLK at the terminal A, the internal clock ICLK being outputted from the crystal oscillating circuit 11. The selecting circuit 14 is inputted with the external clock OCLK at the terminal B, the external clock OCLK being inputted from the mode/external clock terminal M1/CLK. The selecting circuit 14 is inputted with the selecting signal SEL at the terminal S, the signal SEL being outputted from the NAND circuit Z1. The selecting circuit 14 outputs at the terminal X one of the internal clock ICLK inputted into the terminal A and the external clock OCLK inputted into the terminal B.

Concretely, if the H selecting signal SEL is inputted into the terminal S, the selecting circuit 14 outputs at the terminal X the internal clock ICLK inputted into the terminal A. When the L selecting signal SEL is inputted into the terminal S, the selecting circuit 14 outputs at the terminal X the external clock OCLK inputted into the terminal B.

The PLL circuit 15 multiplies by a certain number the internal clock ICLK or the external clock OCLK outputted from the terminal X of the selecting circuit 14 and then outputs the multiplied clock.

The clock control circuit 16 is inputted with the multiplied internal clock ICLK or external clock OCLK, the clock being outputted from the PLL circuit 15. The clock control circuit 16 is inputted with the internal clock ICLK or the external clock OCLK outputted from the selecting circuit 14. The clock control circuit 16 selects one of the clock outputted from the PLL circuit 15 and the clock outputted from the selecting circuit 14 and then outputs the selected clock as the operation clock MCLK of the CPU 17.

Hereafter, the operation of the circuit diagram shown in FIG. 2 will be described with reference to the timing chart of the signal at each component of the microcomputer 10.

Figure 3:
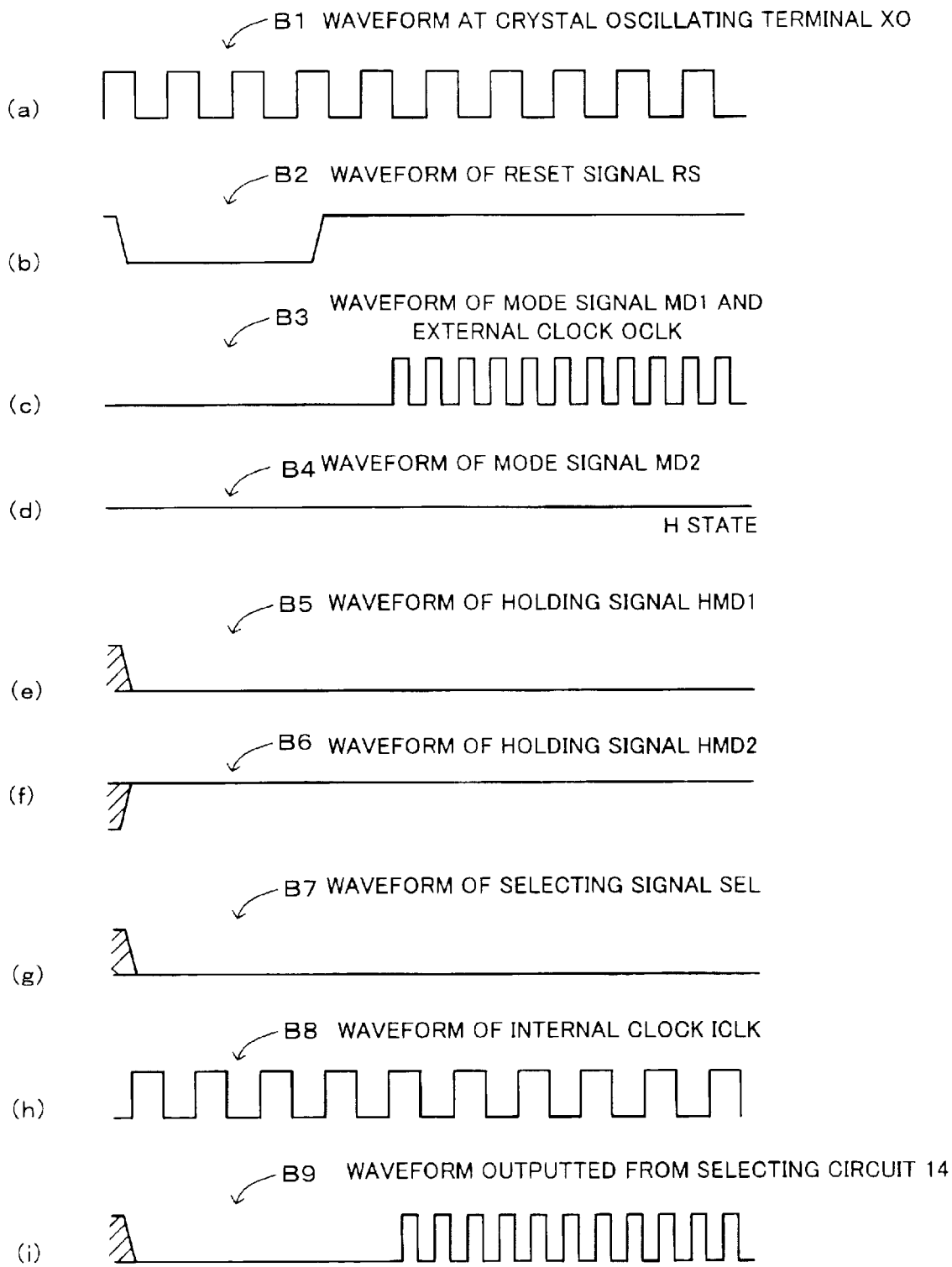
FIG. 3 is a timing chart showing a signal of each component of the microcomputer.

FIG. 3 is a timing chart showing a signal of each component of the microcomputer. The oblique lines shown in FIG. 3 indicate an unstable state of the signal.

The waveform B1 shown in part (a) of FIG. 3 indicates the waveform of the signal appearing at the crystal oscillating terminal X0. The waveform B2 shown in part (b) of FIG. 3 indicates the waveform of the signal to be inputted into the reset terminal RST. The waveform B3 shown in part (c) of FIG. 3 indicates the waveform of the mode signal MD1 or the external clock OCLK to be inputted into the mode/external clock terminal M1/CLK. The waveform B4 shown in part (d) of FIG. 3 indicates the waveform of the mode signal MD2 to be inputted into the mode terminal M2. The waveform B5 shown in part (e) of FIG. 3 indicates the waveform of the holding signal HMD1 to be outputted from the terminal Q1 of the storing circuit 12. The waveform B6 shown in part (f) of FIG. 3 indicates the waveform of the holding signal HMD2 to be outputted from the terminal Q1 of the storing circuit 13. The waveform B7 shown in part (g) of FIG. 3 indicates the waveform of the selecting signal SEL to be outputted from the NAND circuit Z1. The waveform B8 shown in part (h) of FIG. 3 indicates the waveform of the internal clock ICLK to be outputted from the crystal oscillating circuit 11. The waveform B9 shown in part (i) of FIG. 3 indicates the waveform of the clock to be outputted from the selecting circuit 14.

For determining the operation mode of the CPU 17, the reset signal RS to be inputted into the reset terminal RST and the mode signals MD1 and MD2 are applied into the mode/external clock terminal M1/CLK and the mode terminal M2.

In order to use the external clock OCLK as the operation clock MCLK of the CPU 17, while the reset signal RS is being inputted, the L mode signal MD1 and then the external clock OCLK are inputted into the mode/external clock terminal M1/CLK. Further, the H signal is inputted into the mode terminal M2. That is, the signals of the waveforms B2, B3 and B4 shown in FIG. 3 are applied into the reset terminal RST, the mode/external terminal M1/CLK, and the mode terminal M2.

The storing circuit 12 holds the state of the mode signal MD1 being inputted into the mode/external clock terminal M1/CLK, the state appearing while the reset signal RS is being asserted, and then outputs the holding signal HMD1. When the waveform B2 is in the L state (while the reset signal RS is being asserted), the mode signal MD1 being inputted into the mode/external clock terminal M1/CLK is in the lower state than the waveform B3. Hence, the storing circuit 12 outputs at the terminal Q1 the L holding signal HMD1 as indicated in the waveform B5. This mode signal is also inputted into the CPU 17. The CPU 17 is operated at the operation mode responding to the holding signal HMD1.

The storing circuit 13 holds the state of the mode signal MD2 being inputted into the mode terminal M2, the state appearing while the reset signal RS is being asserted, and then outputs the holding signal HMD2. When the waveform B2 is in the L state (the reset signal RS is being inputted), the mode signal MD2 being inputted into the mode terminal M2 is in the higher state than the waveform B4. Hence, as indicated by the waveform B6, the storing circuit 13 outputs at the terminal Q1 the H holding signal HMD2. In addition, this signal is inputted into the CPU 17. The CPU 17 is operated at the operation mode responding to the holding signal HMD2.

The NAND circuit Z1 is inputted with the inverted holding signal HMD1 outputted from the terminal Q2 of the storing circuit 12 and the holding signal HMD2 outputted from the terminal Q1 of the storing circuit 13. The NAND circuit Z1 performs the NAND operation with respect to the inputted signal and then outputs the resulting signal, that is, the selecting signal SEL. The NAND circuit Z1 is inputted with the H signal of the inverted waveform B5 and the H waveform B6. Hence, the NAND circuit Z1 outputs the L selecting signal SEL shown as the waveform B7.

The terminal A of the selecting circuit 14 is inputted with the internal clock ICLK shown as the waveform B8. The terminal B of the selecting circuit 14 is inputted with the external clock OCLK shown as the waveform B3. The selecting circuit 14 is operated to output the internal clock ICLK or the external clock OCLK at the terminal X in response to the selecting signal SEL inputted into the terminal S. Since the signal inputted at the terminal S is the L selecting signal shown as the waveform B7, the selecting circuit 14 outputs the external clock OCLK shown as the waveform B9 being inputted into the terminal B.

The external clock OCLK and the multiplied external clock OCLK derived by the PLL circuit 15 are inputted into the clock control circuit 16. The clock control circuit 16 outputs one of these clocks as the operation clock MCLK of the CPU 17.

In order to specify the internal clock ICLK as the operation clock MCLK of the CPU 17, the H mode signal MD1 is inputted into the mode/external clock terminal M1/CLK or the L mode signal MD2 is inputted into the mode terminal M2.

While the reset signal is being asserted, the mode signal is inputted into the mode terminal and then is stored in the storing circuit. After the mode signal is stored in the storing circuit, the mode terminal can be freely used. Hence, the external clock may be inputted into the mode terminal. That is, the mode terminal may be used for both the external clock and the mode signal, which makes it possible to suppress the increase of the terminals in number.

In the microcomputer provided with the mode terminal for specifying the operation mode of the CPU, since the mode signal is stored in the storing circuit, the external clock is inputted into the mode terminal. This means that a new terminal for the external clock is not necessary.

Given one mode signal, the operation clock may be specified as the external clock or the internal clock. In this case, it is just necessary to remove the mode terminal MD2 and the storing circuit 13 and to directly connect the terminal Q2 of the storing circuit 12 with the terminal S of the selecting circuit 14.

Further, with the combination of three or more mode signals, the operation clock can specified as the external clock or the internal clock. In this case, it is just necessary to add a terminal to which the mode signal is to be inputted and a storing circuit for holding and outputting the mode signal and to input the held mode signal into the NAND circuit Z1.

Figure 4:
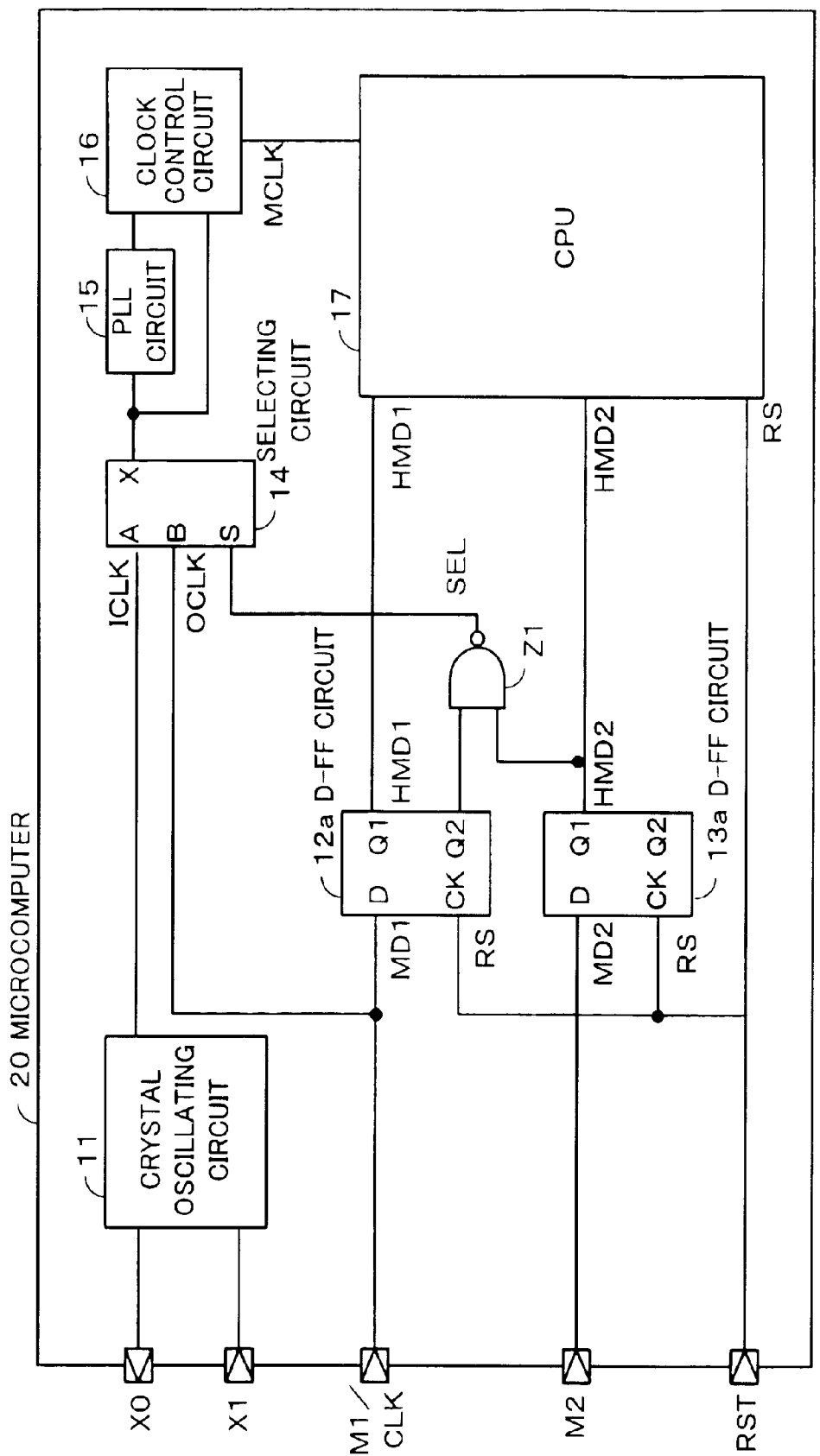
FIG. 4 is a circuit diagram showing a microcomputer provided with a D flip-flop circuit.

Moreover, the D flip-flop circuit may be used for the storing circuits 12 and 13. FIG. 4 is a circuit diagram showing a microcomputer provided with the D flip-flop circuit. In the microcomputer 20 shown in FIG. 4, unlike the microcomputer 10, the D flip-flop (simply referred to as D-FF) circuits 12a and 13a are used in place of the storing circuits 12 and 13. The D-FF circuits 12a and 13a hold the mode signals MD1 and MD2 inputted to the terminal D at the rising edge of a reset signal RS to be inputted to the terminal CK and then outputs the held signals HMD1 and HMD2 at the terminal Q1. At a time, the D-FF circuits 12a and 13a output the inverted signals of the held signals HMD1 and HMD2 at the terminal Q2.

Figure 5:
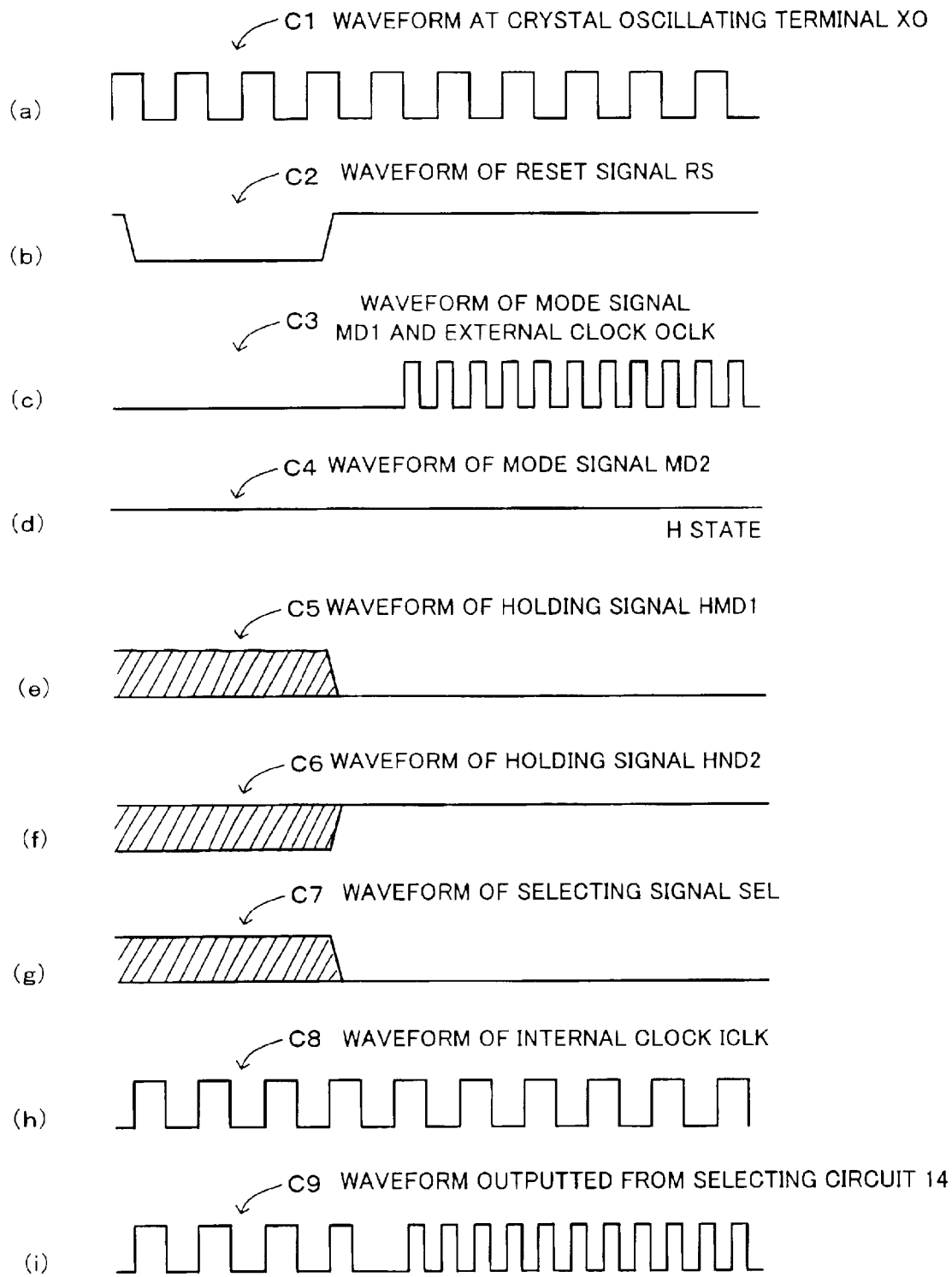
FIG. 5 is a timing chart showing a signal of each component of the microcomputer provided with the D flip-flop circuit.

FIG. 5 is a timing chart showing a signal of each component in the microcomputer 20 provided with the D-FF circuits. The oblique lines shown in FIG. 5 indicate an unstable state of each signal.

The waveform C1 shown in part (a) of FIG. 5 is the waveform of a signal appearing at the crystal oscillating terminal X0.

The waveform C2 shown in part (b) of FIG. 5 is the waveform of the reset signal RS to be inputted into the reset terminal RST. When the reset signal RS is raised from the L state to the H state, the CPU 17 is reset.

The waveform C3 shown in part (c) of FIG. 5 is the waveform of the mode signal MD1 or the external clock to be inputted into the mode/external clock terminal M1/CLK. The mode/external clock terminal M1/CLK is inputted with the L mode signal as shown as the waveform C2 and then the external clock OCLK.

The waveform C4 shown in part (d) of FIG. 5 is the waveform of the mode signal MD2 to be inputted into the mode terminal M2. The mode terminal M2 is kept inputted with the H mode signal MD2.

The waveform C5 shown in part (e) of FIG. 5 is the waveform of the held signal HMD1 outputted at the terminal Q1 of the D-FF circuit 12a. At the rising edge of the reset signal RS, the D-FF circuit 12a holds the state of the mode signal MD1 inputted into the mode/external clock terminal M1/CLK and outputs the held signal HMD1. The waveform C5 is changed from the unstable state into the L state at the rising edge of the reset signal RS earlier than the waveform C2 or C3.

The waveform C6 shown in part (f) of FIG. 5 is the waveform of the held signal MHD2 to be outputted at the terminal Q1 of the D-FF circuit 13a. At the rising edge of the reset signal RS, the D-FF circuit 13a holds the state of the mode signal MD2 being inputted into the mode terminal M2 and then outputs the mode signal MD2. The waveform C6 is changed from the unstable state into the H state at the rising edge of the reset signal earlier than the waveform C2 or C4.

The waveform C7 shown in part (g) of FIG. 5 is the waveform of the selecting signal SEL to be outputted from the NAND circuit Z1. The NAND circuit Z1 is inputted with the inverted signal of the waveform C5 and the signal of the waveform C6. Hence, the NAND circuit Z1 outputs the L selecting signal SEL as shown as the waveform C7.

The waveform C8 shown in part (h) of FIG. 5 is the waveform of the internal clock ICLK to be outputted from the crystal oscillating circuit 11.

The waveform C9 shown in part (i) of FIG. 5 is the waveform of the external clock OCLK to be outputted from the selecting circuit 14. Since the signal of the waveform C7, that is, the L selecting signal SEL is inputted into the terminal S of the selecting circuit 14, the selecting circuit 14 outputs the external clock OCLK shown as the waveform C9 at the terminal X. The waveform C9 is shown in such a manner that the external clock OCLK and then the internal clock ICLK are outputted in series.

As described above, the D-FF circuit holds the mode signal being inputted into the mode terminal at the rising edge of the reset signal and then outputs the mode signal. Afterwards, the external clock is inputted into the mode terminal. That is, after the mode signal is stored in the D-FF circuit, the mode terminal may be freely used. It means that a new terminal for the external clock is not necessary.

The D-FF circuit can hold the mode signals MD1 and MD2 at the falling edge of the reset signal RS.

In turn, the description will be oriented to the second embodiment of the present invention.

Figure 6:
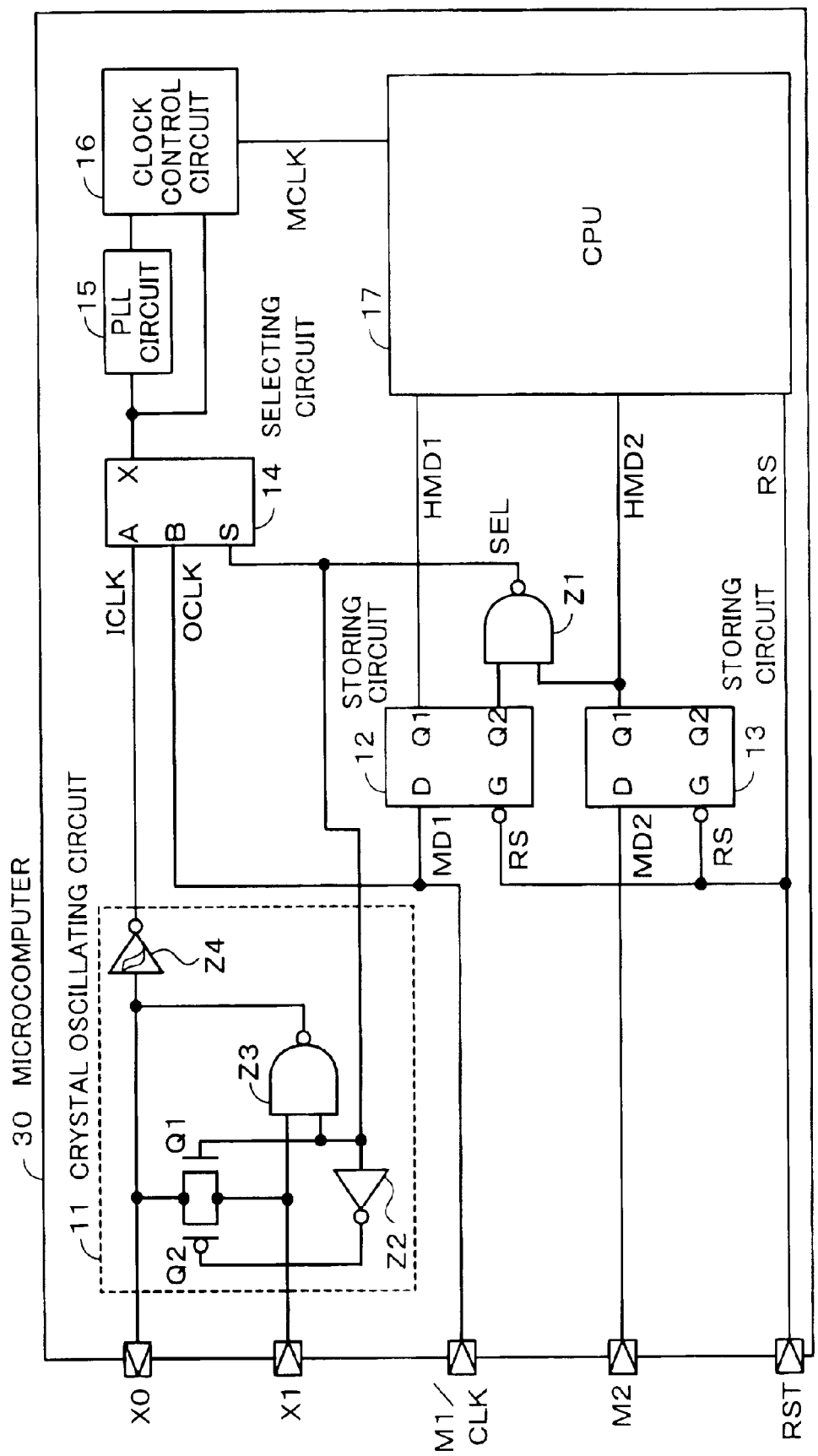
FIG. 6 is a circuit diagram showing a microcomputer according to a second embodiment of the present invention.

FIG. 6 is a circuit diagram showing a microcomputer according to a second embodiment of the present invention. Unlike the microcomputer 10 of the first embodiment, the microcomputer 30 is arranged so that the output of the NAND circuit Z1 is inputted into the crystal oscillating circuit 11. The same components as those of the first embodiment have the same reference numbers. The description about those components is left out.

The crystal oscillating circuit 11 is composed of FET transistors Q1 and Q2, an inverter circuit Z2, a NAND circuit Z3, and a Schmitt trigger circuit Z4.

The FET transistor Q1 is an n-channel FET transistor. When the H signal is inputted into the gate of the transistor Q1, the transistor Q1 connects the source with the drain. The FET transistor Q2 is a p-channel FET transistor. When the L signal is inputted into the gate of the transistor Q2, the transistor Q2 connects the source with the drain.

The source of the FET transistor Q1 is connected with the drain of the FET transistor Q2. The drain of the transistor Q1 is connected with the source of the transistor Q2. The drains of the transistors Q1 and Q2 are connected with the input of the NAND circuit Z3. The output of the NAND circuit Z3 is connected with the sources of the FET transistors Q1 and Q2.

The output of the NAND circuit Z1 is connected with the gate of the FET transistor Q1 and the other input of the NAND circuit Z3. The output of the NAND circuit Z1 is connected with the gate of the FET transistor Q2 through the inverter circuit Z2.

The crystal oscillating terminal X1 is connected with the input of the NAND circuit Z3. The output of the NAND circuit Z3 is connected with the crystal oscillating terminal X0. That is, the NAND circuit Z3 composes a feedback circuit with respect to the crystal oscillator connected with the crystal oscillating terminals X0 and X1.

The Schmitt trigger circuit Z4 is connected with the output of the NAND circuit Z3. The Schmitt trigger circuit Z4 shapes the oscillating signal to be outputted from the NAND circuit Z3 and then outputs the shaped signal as the internal clock ICLK to the selecting circuit 14.

When the resistor inserted in parallel the crystal oscillator connected with the crystal oscillating terminals X0 and X1, that is, the resistor inserted between the source and the drain of each of the FET transistors Q1 and Q2 meets the predetermined relation with the vibrating frequency of the crystal oscillator, the crystal oscillating circuit 11 operates to oscillate on the vibrating frequency of the crystal oscillator. The resistor between the source and the drain of each FET transistor Q1 or Q2 of the crystal oscillating circuit 11 is fixed in the process of manufacturing the microcomputer 30. Hence, the crystal oscillating terminals X0 and X1 are connected with the crystal oscillator with the fixed vibrating frequency.

In the crystal oscillating circuit 11 as described above, when the NAND circuit Z1 outputs the H selecting signal SEL, the source of the FET transistor Q1 is connected with the drain thereof. Further, the selecting signal SEL is inverted into the L signal by the inverter circuit Z2, and the source of the FET transistor Q1 is connected with the drain thereof. The H selecting signal SEL is applied into the input of the NAND circuit Z3.

As a result, the resistance between the source and the drain of each FET transistor Q1 or Q2 takes place in parallel with the crystal oscillator connected with the crystal oscillating terminals X0 and X1, and thus the crystal oscillating circuit 11 operates to vibrate on the vibrating frequency of the crystal oscillator. The circuit 11 outputs the vibrated signal as the internal clock ICLK to the terminal A of the selecting circuit 14.

Since the H selecting signal SEL is outputted from the NAND circuit Z1, the selecting circuit 14 outputs at the terminal X the internal clock ICLK inputted into the terminal A.

When the NAND circuit Z1 outputs the L selecting signal SEL, the transistor Q1 disconnects the source from the drain. The selecting signal SEL is inverted to the H signal by the inverter circuit Z2. In response to the H signal, the FET transistor Q2 disconnects the source from the drain. Further, the L selecting signal SEL is inputted into one input of the NAND circuit Z3.

As a result, the output terminal of the NAND circuit Z3 is always in the H state, so that the crystal oscillating circuit 11 stops the vibration. In both the FET transistors Q1 and Q2, the source is disconnected from the drain, so that no leak current is flown between the input terminal and the output terminal of the NAND circuit Z3.

Since the NAND circuit Z1 outputs the L selecting signal SEL, the selecting circuit 14 outputs at the terminal X the external clock OCLK inputted into the terminal B.

That is, only if the internal clock ICLK is specified as the operation clock of the CPU 17, the crystal oscillating circuit 11 is vibrating. This makes it possible to suppress the power consumption. Further, when the crystal oscillating circuit 11 stops its vibration, in both the FET transistors Q1 and Q2, the source is disconnected from the drain, so that no leak current is flown between the input terminal and the output terminal of the NAND circuit Z3, which leads to suppression of the power consumption.

In place of the storing circuits 12 and 13, the D-FF circuits 12a and 13a shown in FIG. 4 can be used. In this case, likewise, it is possible to stop the vibration of the circuit 11 may.

Figure 7A:
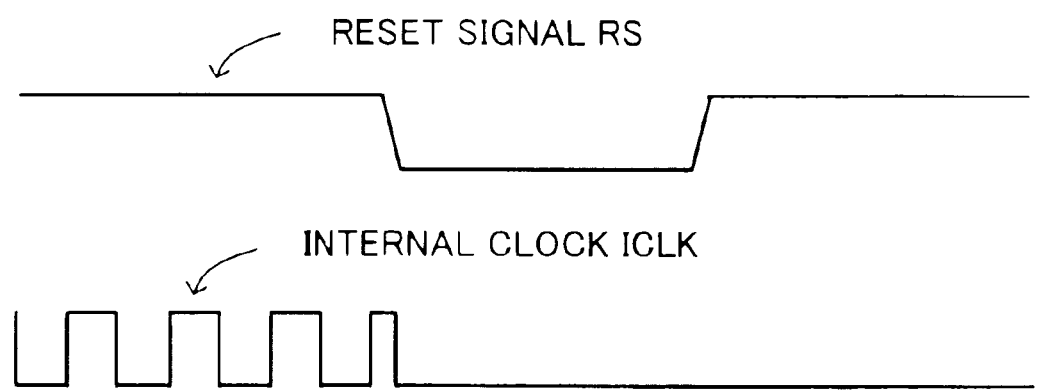
FIG. 7A is a timing chart showing a reset signal and an internal clock in a storing circuit.
Figure 7B:
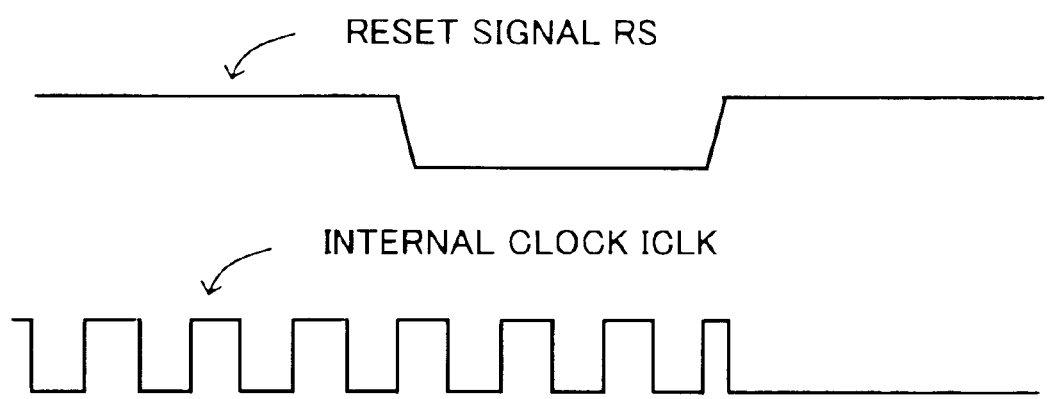
FIG. 7B is a timing chart showing a reset signal and an internal clock in the D flip-flop circuit.

FIG. 7 is a timing chart of the reset signal and the internal clock, in which FIG. 7A is a timing chart in the storing circuit and FIG. 7B is a timing chart in the D-FF circuit.

The storing circuits 12 and 13 are inputted with the reset signal RS at their terminals G and hold and output the mode signals MD1 and MD2. In response to the mode signals, as shown in FIG. 7A, the reset signal RS is made to be the L state, so that the crystal oscillating circuit 11 stops its vibration and thus the output of the internal clock ICLK.

The D-FF circuit holds the mode signal at the rising edge of the reset signal RS inputted into the terminal CK and then outputs the mode signal. Hence, as shown in FIG. 7B, until the reset signal RS is raised from the L state into the H state, the crystal oscillating circuit 11 outputs the internal clock ICLK and then stops its vibration, that is, the output of the internal clock ICLK.

In turn, the description will be oriented to the third embodiment of the present invention.

Figure 8:
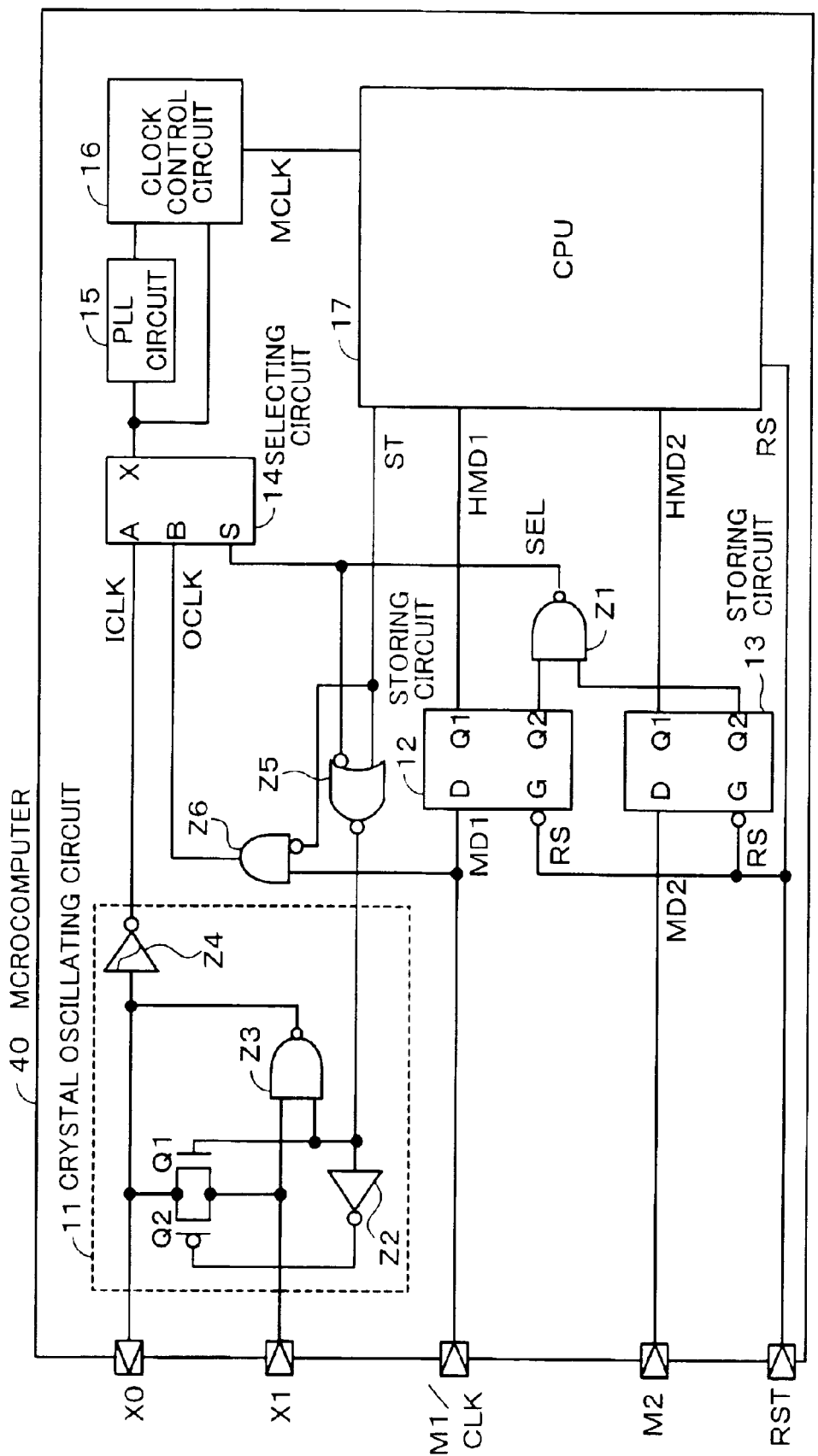
FIG. 8 is a circuit diagram showing a microcomputer according to a third embodiment of the present invention.

FIG. 8 is a circuit diagram showing a microcomputer according to the third embodiment of the present invention. The microcomputer 40 includes a NOR circuit Z5 and an AND circuit Z6 in addition to the microcomputer 30 of the second embodiment. The same components as those of the second embodiment have the same reference numbers. The description about those components is left out.

In order to suppress the power consumption, the CPU 17 starts execution of a program for stopping the supply of the operation clock MCLK, when the H stop signal ST is outputted.

One input of the NOR circuit Z5 is connected with the output of the NAND circuit Z1 and the other input of the circuit Z5 is connected with a signal line to which the CPU 17 outputs the stop signal ST. The output of the NOR circuit Z5 is connected with the input of the inverter circuit Z2 of the crystal oscillating circuit 11.

When the selecting signal of the NAND circuit Z1 is in the L state or the stop signal ST of the CPU 17 is in the H state, the NOR circuit Z5 outputs the L signal.

One end of the AND circuit Z6 is connected with the mode/external clock terminal M1/CLK. The other end of the circuit Z6 is connected with the signal line to which the CPU 17 outputs the stop signal ST. The output of the AND circuit Z6 is connected with the terminal B of the selecting circuit 14.

When the stop signal ST of the CPU 17 is in the L state and the external clock OCLK at the mode/external clock terminal M1/CLK is in the H state, the AND circuit Z6 outputs the H signal. That is, when the stop signal ST of the CPU 17 is in the L state, the AND circuit Z6 outputs the external clock OCLK.

Hereafter, the operation of the microcomputer 40 will be described.

In order to suppress the power consumption, the CPU 17 outputs the H stop signal ST. Hence, the H stop signal ST is inputted into the other terminal of the NOR circuit Z5. The NOR circuit Z5 outputs the L signal to the gate of the FET transistor Q1 and the inverter circuit Z2 of the crystal oscillating circuit 11. This causes the crystal oscillating circuit 11 to stop the internal clock ICLK.

Further, the H stop signal ST is inputted into the other terminal of the AND circuit Z6, so that the AND circuit Z6 stops the output of the external clock OCLK to the selecting circuit 14, the external clock OCLK being inputted from the mode/external clock terminal M1/CLK.

This operation causes the program for reducing the power consumption to be executed. In the program, when the stop signal is outputted, the supply of the internal clock and the external clock is stopped, which makes it possible to reduce the power consumption.

Moreover, when the H stop signal ST is not outputted, if the NAND circuit Z1 outputs the L selecting signal ST (the external clock OCLK is selected as the operation clock MCLK), the NOR circuit Z5 outputs the L signal to the crystal oscillating circuit 11 so that the circuit 11 stops its vibration.

In turn, the fourth embodiment of the present invention will be described.

Figure 9:
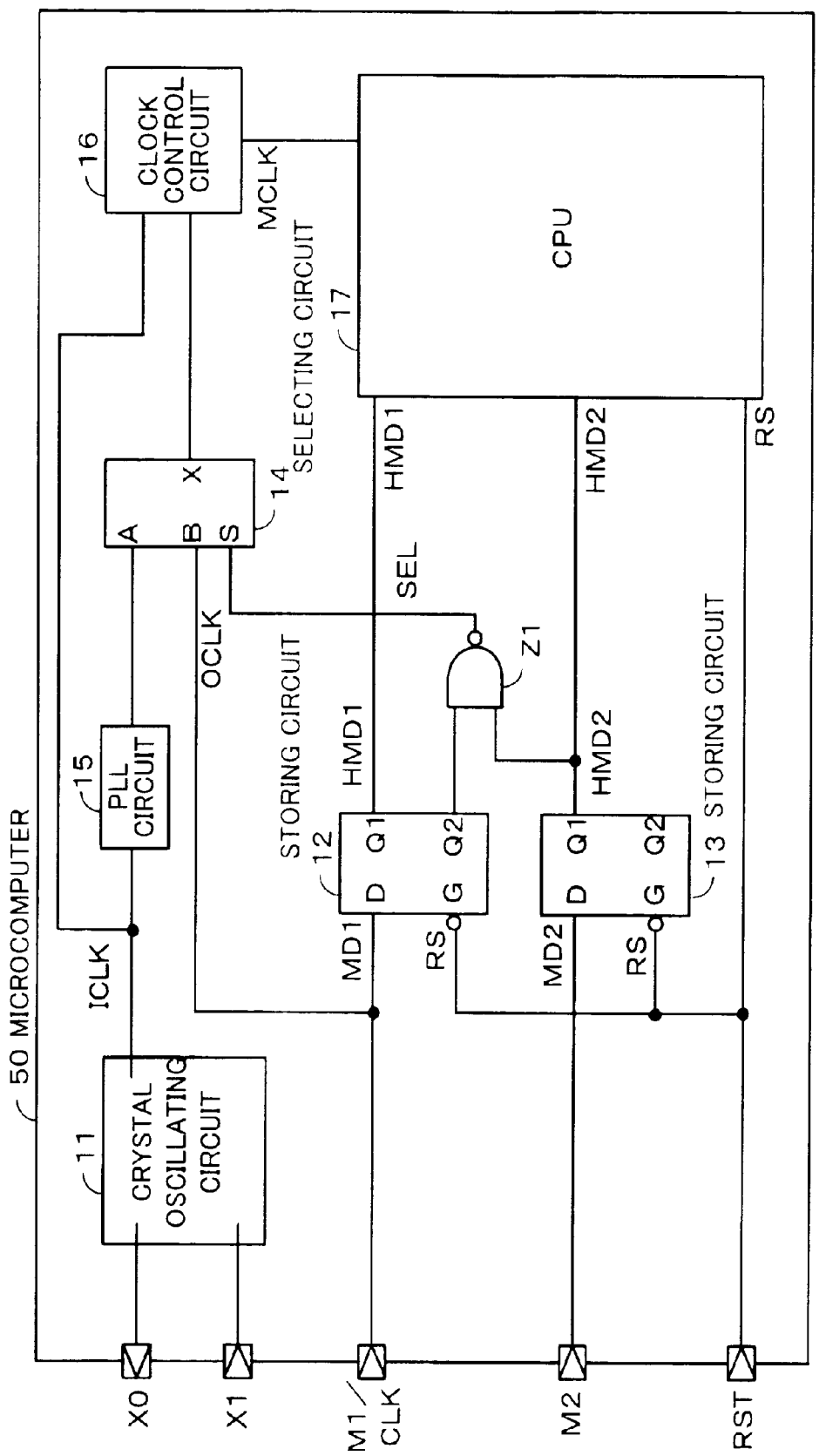
FIG. 9 is a circuit diagram showing a microcomputer according to a fourth embodiment of the present invention.
Figure 10:
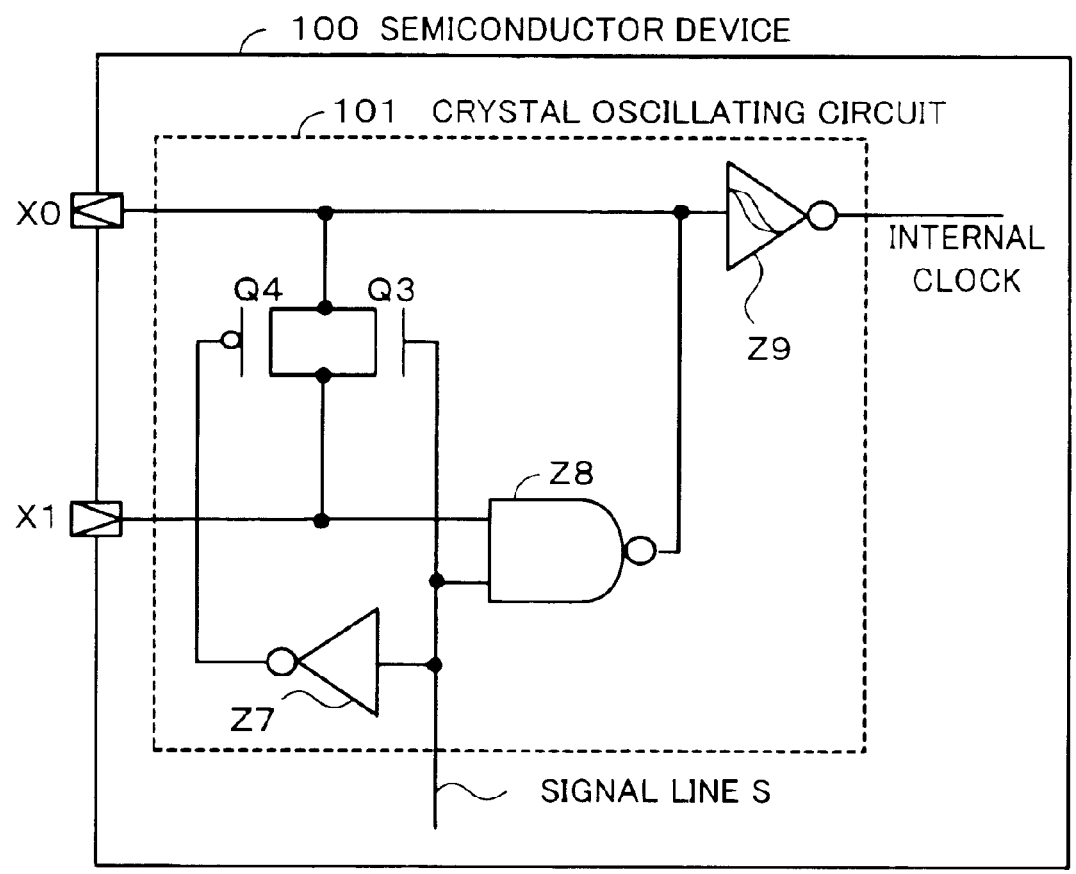
FIG. 10 is a circuit diagram showing a crystal oscillating circuit included in the conventional semiconductor device.
Figure 11:
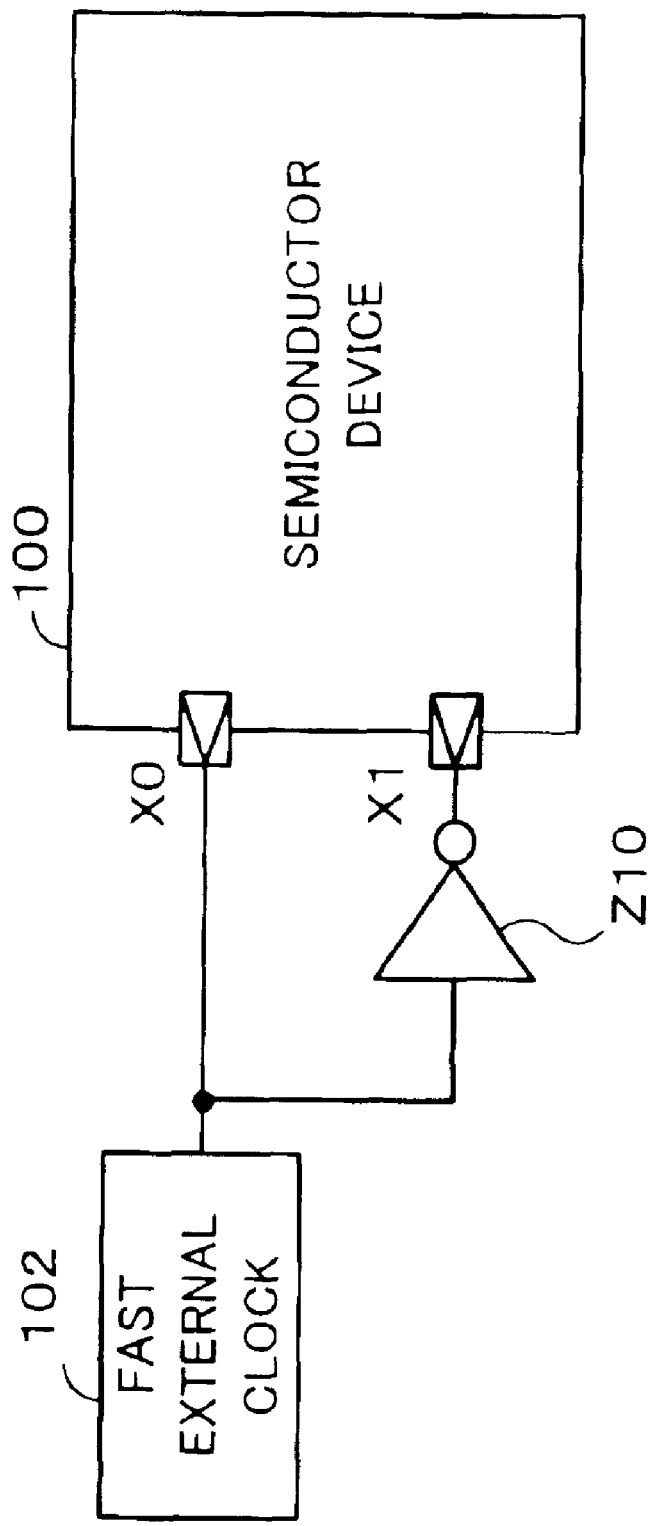
FIG. 11 is a circuit diagram showing a semiconductor including an inverter circuit connected with the crystal oscillating terminal.

FIG. 9 is a circuit diagram showing a microcomputer according to the fourth embodiment of the present invention. The microcomputer 50 is different from the microcomputer 10 of the first embodiment in the respect of the connecting location of the PLL circuit 15. The same components as those of the first embodiment have the same reference numbers. The description about those components is left out.

The microcomputer 50 is arranged so that the internal clock ICLK supplied from the crystal oscillating circuit 11 is inputted into the PLL circuit 15 as well as the clock control circuit 16.

The PLL circuit 15 multiplies the frequency of the internal clock ICLK outputted from the crystal oscillating circuit 11 by a certain number and then outputs the multiplied frequency into the terminal A of the selecting circuit 14.

That is, by connecting the PLL circuit 15 between the crystal oscillating circuit 11 and the selecting circuit 14 so that only the internal clock ICLK can be multiplied, the external clock OCLK is not multiplied by the PLL circuit 15. Hence, in the case of operating the CPU 17 at a fast external clock or performing the fast operation test at an external clock, the external clock is not multiplied. This makes it possible to reduce the locking time of the PLL circuit 15, thereby reducing the rising time of the CPU 17 or the time taken in performing the fast operation test.

As described above, according to the present invention, the storing circuit holds the using information signal at the input terminal to which the external clock and the using information signal are to be inputted and then outputs the signal to the selecting circuit. Depending on the state of the using information signal, the internal clock or the external clock is outputted. Thus, after the using information signal is stored in the storing circuit, the external clock can be inputted into the input terminal. This means that the input terminal can be used for both the external clock and the using information signal, which leads to suppressing the increase of the terminals in number.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device that is operated in synchronism with an internal or an external clock, comprising:

an oscillating circuit for generating the internal clock on the basis of a vibrating frequency of an oscillator connected externally;

an input terminal to which a using information signal and the external clock are to be inputted successively, the using information signal indicating using information of the external clock, wherein said using information signals is to be inputted during a first period and said external clock is to be inputted during a second period following said first period;

a storing circuit for holding the state of the using information signal in response to a reset signals which is to be inputted during said first period; and a selecting circuit for outputting one of the internal clock and the external clock during said second period, depending on the state of the using information signal held by said storing circuit.

2. The semiconductor device according to claim 1, wherein the crystal oscillating circuit includes a control circuit for controlling generation of the internal clock so that the control circuit stops generation of the internal clock in response to the using information signal.

3. The semiconductor device according to claim 2, wherein the control circuit stops generation of the internal clock if the using information signal indicates the use of the external clock.

4. The semiconductor device according to claim 1, further comprising a cutoff circuit for cutting off an input of the external clock in response to a clock stop signal generated inside, and wherein the oscillating circuit includes a control circuit for stopping generation of the internal clock in response to the clock stop signal.

5. The semiconductor device according to claim 1, further comprising a phase locked loop circuit for multiplying the internal clock outputted from the oscillating circuit by a certain number and then outputting the multiplied internal clock into the selecting circuit.

6. The semiconductor device according to claim 1, wherein while the reset signal is asserted, the using information signal is inputted into the input terminal, and then the external clock is inputted into the input terminal.

* * * * *